Figure 1:
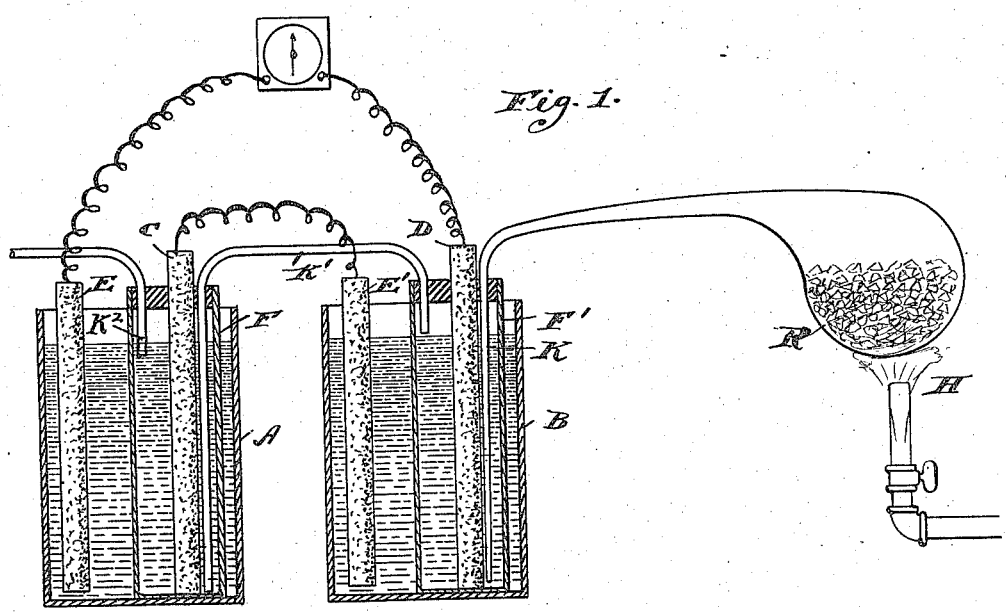

(No Model.) 2 Sheets—Sheet 1.

J. R. PAYSON, Jr.
METHOD OF PRODUCING ELECTRICITY.

No. 567,721. Patented Sept. 15, 1896.

Witnesses,
J. D. Mann,
Frederick B. Goodwin

Inventor,
Joseph R. Payson Jr.
By Effield, Fowler & Linthicum
Attys.

(No Model.) 2 Sheets—Sheet 2.
J. R. PAYSON, Jr.
METHOD OF PRODUCING ELECTRICITY.
No. 567,721. Patented Sept. 15, 1896.
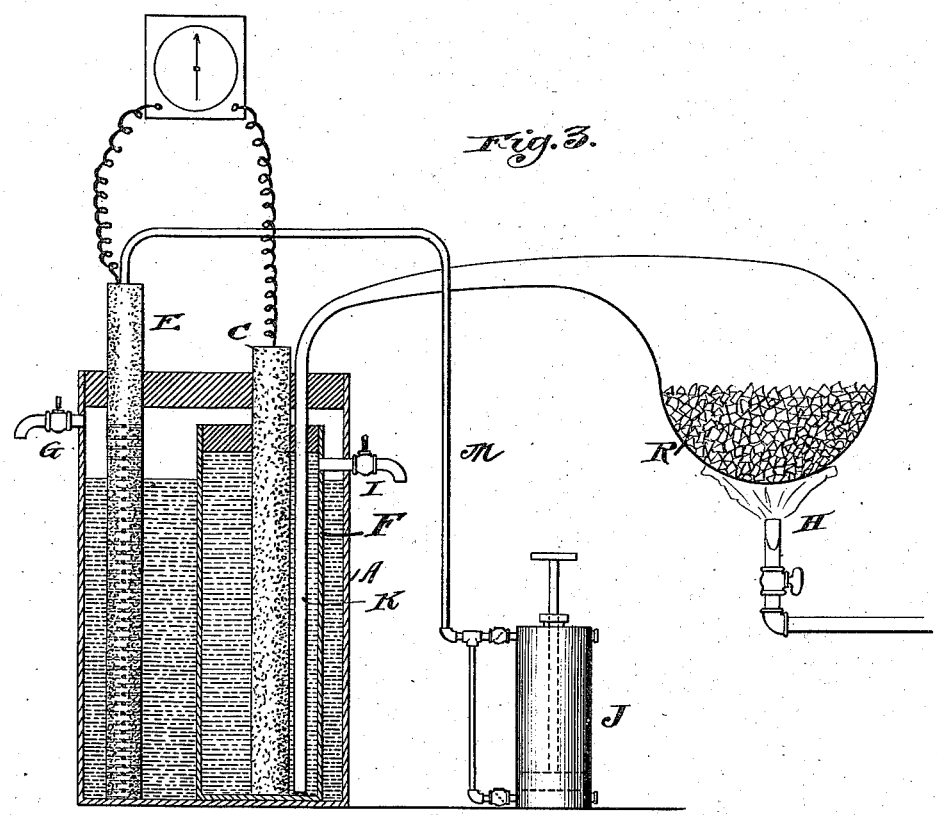

UNITED STATES PATENT OFFICE.

JOSEPH R. PAYSON, JR., OF CHICAGO, ILLINOIS.

METHOD OF PRODUCING ELECTRICITY.

SPECIFICATION forming part of Letters Patent No. 567,721, dated September 15, 1896.

Application filed February 24, 1896. Serial No. 580,499. (No model.)

*To all whom it may concern:*

Be it known that I, JOSEPH R. PAYSON, Jr., of Chicago, Illinois, have invented a certain new and Improved Method of Obtaining Electricity, of which the following is a specification.

The object of my invention is to provide an inexpensive method of obtaining practical currents of electricity from cheap materials on a large scale.

My invention relates to that class of electric generators called "primary batteries," although my improvement may be adapted to be used as a secondary cell.

My invention consists in using an electrolyte surrounding the positive electrode, which electrolyte shall be composed of combustible substances or gases which are unstable in their nature, or, what amounts to the same thing, said electrolyte is capable of holding in solution unstable combustible gases or substances, so that when a current passes through the electrolyte the latter is decomposed and furnishes a large amount of combustible gases or substances in a nascent state, so that the latter may unite chemically or burn with the oxygen or other negative gases of said electrolyte. Heretofore in batteries of this character the positive electrode has consisted of some oxidizable metal and an acid or alkaline electrolyte, or, if a gas-battery, carbon or other non-oxidizable poles have been used adapted to absorb simple or elementary combustible gases supplied thereto; but so far as I am aware non-oxidizable positive electrodes surrounded by an electrolyte containing positive or combustible gases in unstable combination have not been used and are new. It is well known that supplying a simple positive gas, such as hydrogen, has no effect on the positive electrode, unless a special construction be employed and the electrode covered with some absorptive substance. This latter plan has never been practical. I have discovered, however, that if an unstable gas, such as sulfureted hydrogen, ($H_2S$,) be fed into an electrolyte, say acidulated water, a current is produced, because the above gas, being soluble in water and decomposing on the passage of a slight current, furnishes free hydrogen in a nascent state, which, as is well known, is much more powerful to unite with the oxygen also thus generated in the decomposition of the water. As sulfureted hydrogen, however, is not very soluble in water, one volume of water absorbing only four volumes of this gas, a weak solution only of the gas results, producing with bichromate of potash as a depolarizer at the negative pole from one-half a volt to a volt, according to the amount of sulfureted hydrogen employed in the solution surrounding the positive electrode. I have discovered that by injecting sulfureted hydrogen into a solution of ammonia surrounding the positive electrode, thus producing the several sulfids of ammonium, namely, ammonium sulfid, $((NH_4)_2S,)$ ammonium disulfid, $(NH_4S_2,)$ and ammonium hydrosulfid, $(NH_4HS,)$ &c., in a battery containing an alkaline depolarizing solution, a much higher electromotive force (amounting to one volt) is obtained than when the sulfides of the other alkaline metals, such as potassium and sodium, are used in the electrolyte surrounding the positive electrode.

Figure 2:

Figure 1 is a sectional elevation of a simple form of the apparatus. Fig. 2 is a sectional detail of the negative electrode, showing an air-tube inserted in a longitudinal cavity thereof; and Fig. 3 is a diagrammatic view, partly in section, showing the means for supplying the air under pressure and the top of the cells closed, with valve-vents provided in the cups.

In the accompanying drawings, Fig. 1 represents a battery of two cells A and B in which E E' are the negative electrodes, and C D are the positive electrodes, inclosed by the porous cups F F'. The electrodes may be composed of carbon or other practically unoxidizable material. A retort R is heated by a source of heat H and contains any suitable combination of substances to obtain the special combination of combustible gases or substances desired. If compounds of hydrogen and sulfur are desired, nitrogenous substances, such as bones, hide-clippings, manure, or even sewerage or coal may be used. When these substances do not contain enough sulfur, the latter may be incorporated with the same. The sulfur not being oxidized, but merely separated, may be removed from the battery from time to time and used over again, the only object being to use the sulfur as a vehicle temporarily to utilize the hydrogen of the ammoniacal products obtained by the destructive distillation of the above-mentioned nitrogenous compounds. Where sulfureted hydrogen alone is desired, a mixture of tallow and sulfur may be distilled in the retort.

I have mentioned compounds of hydrogen and sulfur because they are cheap and effective, hydrogen producing at ordinary temperatures a high electromotive force. It is obvious, however, that other compounds can be used, such, for instance, as the compounds of cyanogen in solution. Referring again to the drawings, the products of distillation from the retort R, say, for instance, ammonium sulfid, made more chemically active by being warm or hot, are conveyed in a gaseous form by the tube K into the porous cup F', which latter is filled with water. The space outside of the porous cups may in this case be filled with any suitable alkaline solution, the ammonium-sulfid gas coming from the tube K being absorbed by the water in the porous cup F'. The porous cups F F' are closed at their tops, perforations being made for the pipes and electrodes shown. Surplus ammonium-sulfid gas passes from the porous cup F' by the tube K' into the second porous cup F and thence through the water of the latter to the tube K² and thence into the air or any other desirable number of cells of a similar description. The electrolyte outside of the porous cups may of course consist of any well-known depolarizing solution, such as potassium or sodium nitrate, &c., but on a large scale it would probably be cheaper to inject air for this purpose. For this latter purpose I have devised a special form of negative electrode, (shown in Fig. 2,) consisting of a solid mass of carbon with a central longitudinal cavity, minute perforations being formed in the shell transecting the central cavity, so that air furnished as by the tube M is expelled into the electrolyte in the form of jets, its oxygen uniting with the hydrogen liberated therein by the action of the battery. This special electrode can also be used in the positive cell if desired, being supplied with the combustible gas, and especially when the battery is to be used as a storage-cell, when the necessary gases can be supplied from proper tanks or reservoirs.

In Fig. 3 I have indicated an air-compressor J, having the delivery-pipe M connected thereto. The top of the outer cell is closed, as at M', and the cell F is also closed. The outside cell is provided with a valved vent G and the cell F is provided with a valved vent I. In this form of construction the electrolyte surrounding the positive electrode is under the pressure due to the injected sulfureted hydrogen and the electrolyte surrounding the negative electrode is under the pressure of the air forced in by the compressor F. The vent G is used to exhaust the nitrogen of the air from the outer cell or chamber, and the vent I for drawing off the water formed in the inner cell, but said vent is kept closed ordinarily to prevent the fluid of the inner cell from being forced out.

I claim—

1. A galvanic cell having its electrodes surrounded by diverse electrolytic fluids of which the electrolyte surrounding the positive electrode contains sulfureted hydrogen and a diaphragm separating said fluids, substantially as described.

2. A galvanic cell having its positive electrode surrounded by an electrolytic fluid, composed of ammonia, having sulfureted hydrogen in combination therewith, a negative electrode and electrolytic fluid surrounding the same and a diaphragm interposed between the electrodes substantially as described.

3. A galvanic cell having its positive electrode surrounded by an electrolyte containing sulfureted hydrogen under pressure, a negative electrode, an electrolytic fluid surrounding the same, a diaphragm interposed between the electrodes and means for applying a depolarizer under pressure to the electrolyte surrounding the negative electrode.

4. A galvanic cell having its positive electrode surrounded by an electrolyte containing sulfureted hydrogen under pressure, a porous cup containing said electrolyte, a negative electrode provided with a longitudinal cavity and transverse apertures communicating therewith and means for supplying air under pressure to said cavity, substantially as described.

JOSEPH R. PAYSON, Jr.

Witnesses:
C. C. LINTHICUM,
L. F. McCREA.